United States Patent
Tatsumi et al.

(10) Patent No.: US 9,382,498 B2
(45) Date of Patent: Jul. 5, 2016

(54) ANTIOXIDANT COMPOSITION AND LUBRICATING OIL COMPOSITION CONTAINING SAME

(75) Inventors: Yokio Tatsumi, Tokyo (JP); Kazuhiro Umehara, Tokyo (JP); Shinji Iino, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 13/822,494

(22) PCT Filed: Aug. 26, 2011

(86) PCT No.: PCT/JP2011/069253
§ 371 (c)(1),
(2), (4) Date: Mar. 12, 2013

(87) PCT Pub. No.: WO2012/035954
PCT Pub. Date: Mar. 22, 2012

(65) Prior Publication Data
US 2013/0184190 A1 Jul. 18, 2013

(30) Foreign Application Priority Data
Sep. 14, 2010 (JP) .................................. 2010-205547

(51) Int. Cl.
| | | |
|---|---|---|
| *C10M 141/06* | (2006.01) | |
| *C10M 129/10* | (2006.01) | |
| *C10M 133/12* | (2006.01) | |
| *C09K 15/08* | (2006.01) | |
| *C09K 15/18* | (2006.01) | |
| *C09K 15/26* | (2006.01) | |

(52) U.S. Cl.
CPC .............. *C10M 141/06* (2013.01); *C09K 15/08* (2013.01); *C09K 15/18* (2013.01); *C09K 15/26* (2013.01); *C10M 129/10* (2013.01); *C10M 133/12* (2013.01); *C10M 2203/1006* (2013.01); *C10M 2205/0285* (2013.01); *C10M 2207/024* (2013.01); *C10M 2207/026* (2013.01); *C10M 2215/064* (2013.01); *C10M 2215/065* (2013.01); *C10N 2220/022* (2013.01); *C10N 2230/10* (2013.01); *C10N 2240/02* (2013.01); *C10N 2240/04* (2013.01); *C10N 2240/08* (2013.01); *C10N 2240/10* (2013.01); *C10N 2240/12* (2013.01); *C10N 2240/201* (2013.01); *C10N 2240/30* (2013.01); *C10N 2240/40* (2013.01); *C10N 2240/402* (2013.01); *C10N 2250/10* (2013.01); *C10N 2270/02* (2013.01)

(58) Field of Classification Search
CPC .............. C10M 141/06; C10M 129/10; C10M 133/12; C10M 2203/1006; C10M 2205/0285; C10M 2207/024; C10M 2207/026; C10M 2215/064; C10M 2215/065; C10N 2220/022; C10N 2230/10; C10N 2240/02; C10N 2240/04; C10N 2240/08; C10N 2240/10; C10N 2240/12; C10N 2240/201; C10N 2240/30; C10N 2240/40; C10N 2240/402; C10N 2250/10; C09K 15/08; C09K 15/18; C09K 15/26
USPC .................................................. 508/563, 584
See application file for complete search history.

(56) References Cited

U.S. PATENT DOCUMENTS

2009/0005478 A1* 1/2009 Gelbin et al. ................. 524/186

FOREIGN PATENT DOCUMENTS

| | | |
|---|---|---|
| EP | 1 669 436 | 6/2006 |
| JP | 2006-117728 | 5/2006 |
| JP | 2008-101144 | 5/2008 |
| JP | 2008-523203 | 7/2008 |
| JP | 2009-197135 | 9/2009 |
| WO | 2009/009293 | 1/2009 |

OTHER PUBLICATIONS

International Search Report issued Oct. 11, 2011 in International (PCT) Application No. PCT/JP2011/069253.
Extended Supplementary European Search Report issued Mar. 25, 2015 in corresponding Application No. 11824962.2.

* cited by examiner

*Primary Examiner* — James Goloboy
(74) *Attorney, Agent, or Firm* — Wenderoth, Lind & Ponack, L.L.P.

(57) ABSTRACT

Provided is an antioxidant composition, including: a compound (A) represented by the following general formula (1); and an amine-based antioxidant (B) and/or a phenol-based antioxidant (C) other than the compound (A):

[Chem. 1]

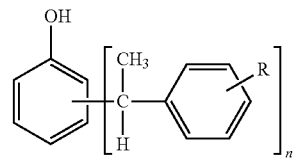

(1)

(wherein R represents a hydrogen atom or an alkyl group having 1 to 4 carbon atoms, and n represents a number from 1 to 3.).

2 Claims, No Drawings

ANTIOXIDANT COMPOSITION AND LUBRICATING OIL COMPOSITION CONTAINING SAME

TECHNICAL FIELD

The present invention relates to an antioxidant composition capable of providing a lubricating oil having a long shelf life, and a lubricating oil composition containing the antioxidant composition.

BACKGROUND ART

A lubricating oil is usually blended with an antioxidant for the purposes of improving shelf life or product stability. For the antioxidant, phenol based, amine based, sulfur based and phosphorus based types of antioxidants exist. However, in view of problems such as waste oil treatment, as there is a tendency to avoid additives containing sulfur or phosphorus atoms in lubricating oils, phenol or amine based antioxidants are usually used. In addition, due to the increase in high performance of machinery requiring lubricating oil, there has been an increase in demand for high temperature lubricating oils and a reduction of the amount of waste oil treated which has led to the need for lubricating oils with even longer shelf lives, thus the marketplace has placed high demands on improved performance antioxidants.

In view of this, in order to improve the anti-oxidation performance of lubricating oils, a method capable of realizing an increase in the shelf life of lubricating oils by blending ratios of various types of antioxidants has been proposed. For example, Patent Document 1 discloses a long life fuel saving engine oil composition characterized in that a mineral oil and/or a synthetic base oil contains an amine-based antioxidant and a phenol-based antioxidant at 1.2 mass % or more in total, in which a mass ratio (N/O) of a nitrogen content (N) of the amine-based antioxidant to an oxygen content (O) of the phenol-based antioxidant is 0.06 to 0.5, and contains zinc dialkyldithiophosphate (ZnDTP) at 0.02 to 0.06 mass % in terms of phosphorus (P), and further contains molybdenum dithiocarbamate (MoDTC) at 0.045 mass % or more in terms of molybdenum (Mo). Further, Patent Document 2 discloses a lubricant composition containing a natural and/or synthetic lubricating base oil, a first antioxidant formed of a particular secondary diarylamine, a second antioxidant formed of a particular substituted p-phenylenediamine, and a third antioxidant formed of a particular substituted phenol.

Further, a method involving the use of an antioxidant containing a metal such as molybdenum has also been proposed. For example, Patent Document 3 discloses an antioxidant composition characterized by it containing an organic molybdenum compound and a lubricating oil base oil having a total aromatic content of 20 to 100 mass %. In addition, a method involving the use of a hindered amine-based antioxidant has also been proposed. For example, Patent Document 4 discloses an antioxidant composition for a lubricating oil, characterized by containing a particular amine compound and a phenol compound containing one or more ester groups.

PRIOR ART DOCUMENTS

Patent Documents

Patent Document 1: JP 2008-101144 A
Patent Document 2: JP 2008-523203 W
Patent Document 3: JP 2006-117728 A
Parent Document 4: JP 2009-197135 A

SUMMARY OF THE INVENTION

Problem to be Solved by the Invention

However, in Patent Document 4 and the like, there are cases in which high anti-oxidation performance may not be obtained depending on the temperatures of use. In Patent Document 3 and the like, there is the problem that as lubricating oil is mixed with metal atoms, there is heavy environmental cost in its disposal. In view of this, many attempts have been made to improve anti-oxidation performance by combining existing antioxidants that do not contain metal atoms such as in Patent Documents 1 and 2 and the like. However, at present, they have not been able to obtain the high anti-oxidation performance demanded.

Accordingly, the problem that the present invention attempts to solve is to provide an antioxidant composition not containing a metal element by which a lubricating oil with a longer shelf life can be realized, and a lubricating oil composition containing this antioxidant composition. More specifically, to provide an antioxidant composition which displays excellent anti-oxidization performance as a result of the synergistic effects of combining a specific phenol-based compound with a general amine-based or phenol-based antioxidant, and a lubricating oil composition containing this antioxidant composition.

Means for Solving the Problem

In view of the above, the inventors of the present invention have made extensive studies. As a result, the inventors have found an antioxidant composition which has high anti-oxidation performance and does not impair the stability of a lubricating oil composition even when dissolved in a base oil, leading to the present invention.

That is, the present invention provides an antioxidant composition, including: a compound (A) represented by the following general formula (1); and an amine-based antioxidant (B) and/or a phenol-based antioxidant (C) other than the compound (A)

[Chem. 1]

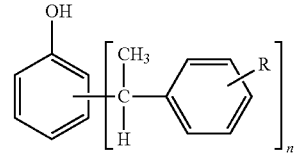

(1)

(wherein R represents a hydrogen atom or an alkyl group having 1 to 4 carbon atoms, and n represents a number from 1 to 3.)

Effects of the Invention

An effect of the present invention is the provision of an antioxidant composition free of any metal element by which a lubricating oil having a longer shelf life can be realized, and a lubricating oil composition containing this antioxidant composition.

BEST MODE FOR CARRYING OUT THE INVENTION

A compound (A) to be used in the present invention may be represented by the following general formula (1):

[Chem. 2]

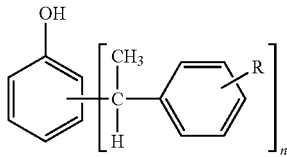

(wherein R represents a hydrogen atom or an alkyl group having 1 to 4 carbon atoms, and n represents a number from 1 to 3.)

In the compound represented by the general formula (1), R represents a hydrogen atom or an alkyl group having 1 to 4 carbon atoms. Examples of the alkyl group having 1 to 4 carbon atoms include a methyl group, an ethyl group, a propyl group, a branched propyl group, a butyl group, and a branched butyl group. Of these, a hydrogen atom or a methyl group is preferred as R, and a hydrogen atom is more preferred, because of inexpensive cost and easy availability.

In the general formula (1), n represents a number from 1 to 3. Depending on number of n, several different isomers can be obtained. For example, when R represents a hydrogen atom and n represents 1, the compound represented by the general formula (1) is any one of 1-styrenated phenol, 2-styrenated phenol, and 3-styrenated phenol. Likewise, when n represents 2, the compound represented by the general formula (1) is any one of 1,2-distyrenated phenol, 1,3-distyrenated phenol, 1,4-distyrenated phenol, 1,5-distyrenated phenol, 2,3-distyrenated phenol, 2,4-distyrenated phenol, and 2,5-distyrenated phenol. Furthermore, when n represents 3, the compound represented by the general formula (1) is any one of 1,2,3-tristyrenated phenol, 1,2,4-tristyrenated phenol, 1,2,5-tristyrenated phenol, 1,3,4-tristyrenated phenol, 1,3,5-tristyrenated phenol, and 2,3,4-tristyrenated phenol.

The compound (A) represented by the general formula (1) may be a single compound or a mixture of two or more kinds of compounds, and preferably is a compound in which n represents 2 or contains the compound in which n represents 2 as a main component because of the high synergistic effect of anti-oxidation and high solubility in a base oil, more preferably it is a distyrenated phenol or contains a distyrenated phenol as a main component from the viewpoint of economic efficiency.

An amine-based antioxidant (B) to be used in an antioxidant composition of the present invention may be any known amine-based antioxidant. Examples thereof include: naphthylamine-based antioxidants such as 1-naphtylamine, phenyl-1-naphthylamine, p-octylphenyl-1-naphthylamine, p-nonylphenyl-1-naphthylamine, p-dodecylphenyl-1-napythylamine, and phenyl-2-naphthylamine; phenylenediamine-based antioxidants such as N,N'-diisopropyl-p-phenylenediamine, N,N'-diisobutyl-p-phenylenediamine, N,N'-diphenyl-p-phenylenediamine, N,N'-di-β-naphthyl-p-phenylenediamine, N-phenyl-N'-isopropyl-p-phenylenediamine, N-cyclohexyl-N'-phenyl-p-phenylenediamine, N-1,3-dimethylbutyl-N'-phenyl-p-phenylenediamine, dioctyl-p-phenylenediamine, phenylhexyl-p-phenylenediamine, and phenyloctyl-p-phenylenediamine; diphenylamine-based antioxidants such as dipyridylamine, diphenylamine, p,p'-di-n-butyldiphenylamine, p,p'-di-t-butyldiphenylamine, p,p'-di-t-pentyldiphenylamine, p,p'-dioctyldiphenylamine, p,p'-dinonyldiphenylamine, p,p'-didecyldiphenylamine, p,p'-didodecyldiphenylamine, p,p'-distyryldiphenylamine, p,p'-dimethoxydiphenylamine, 4,4'-bis(4-α,α-dimethylbenzoyl) diphenylamine, p-isopropoxydiphenylamine, and dipyridylamine; and phenothiazine-based antioxidants such as phenothiazine, N-methylphenothiazine, N-ethylphenothiazine, 3,7-dioctylphenothiazine, phenothiazine carboxylic acid ester, and phenoselenazine. Of these, a compound represented by the following general formula (2) or general formula (3) is preferred because of its good anti-oxidation performance.

[Chem. 3]

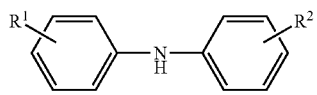

(wherein $R^1$ and $R^2$ each independently represent a hydrogen atom or an aliphatic hydrocarbon group having 1 to 18 carbon atoms.)

[Chem. 4]

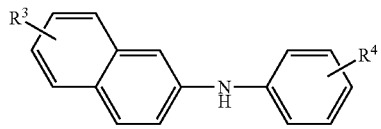

(wherein $R^3$ and $R^4$ each independently represent a hydrogen atom or an aliphatic hydrocarbon group having 1 to 18 carbon atoms.)

In the compounds represented by the general formula (2) and general formula (3), $R^1$ to $R^4$ each independently represent a hydrogen atom or an aliphatic hydrocarbon group having 1 to 18 carbon atoms. Examples of the aliphatic hydrocarbon group having 1 to 18 carbon atoms include: alkyl groups such as a methyl group, an ethyl group, a propyl group, a branched propyl group, a butyl group, a branched butyl group, a hexyl group, a branched hexyl group, a pentyl group, a branched pentyl group, a heptyl group, a branched heptyl group, an octyl group, a branched octyl group, a 2-ethylhexyl group, a nonyl group, a branched nonyl group, a decyl group, a branched decyl group, a dodecyl group, a branched dodecyl group, a tridecyl group, a branched tridecyl group, a tetradecyl group, a branched tetradecyl group, a pentadecyl group, a branched pentadecyl group, a hexadecyl group, a branched pentadecenyl group, a heptadecyl group, a branched heptadecyl group, an octadecyl group, and a branched octadecyl group; and alkenyl groups such as a vinyl group, a propenyl group, a butenyl group, an isobutenyl group, a pentenyl group, a hexenyl group, a heptenyl group, an octenyl group, a decenyl group, a dodecenyl group, a pentadecenyl group, and an octadecenyl group. Of these, a hydrogen atom or an alkyl group is preferred, and a hydrogen atom or a linear alkyl group is more preferred because of its good anti-oxidation performance.

A phenol-based antioxidant (C) to be used in the antioxidant composition of the present invention may be any known phenol-based antioxidant other than the compound (A) represented by the general formula (1). Examples thereof include 2,6-di-tertiary butylphenol (hereinafter, tertiary butyl is abbreviated as t-butyl), 2,6-di-t-butyl-p-cresol, 2,6-di-t-butyl-4-methylphenol, 2,6-di-t-butyl-4-ethylphenol, 2,4-dimethyl-6-t-butylphenol, 4,4'-methylenebis(2,6-di-t-butylphenol), 4,4'-bis(2,6-di-t-butylphenol), 4,4'-bis(2-methyl-6-t-butylphenol), 2,2'-methylenebis(4-methyl-6-t-butylphenol), 2,2'-methylenebis(4-ethyl-6-t-butylphenol), 4,4'-butylidenebis(3-methyl-6-t-butylphenol), 4,4'-isopropylidenebis(2,6-di-t-butylphenol), 2,2'-methylenebis(4-methyl-6-cyclohexylphenol), 2,2'-methylenebis(4-methyl-6-nonylphenol), 2,2'-isobutylidenebis(4,6-dimethylphenol), 2,6-bis(2'-hydroxy-3'-t-butyl-5'-methylbenzyl)-4-methylphenol, 3-t-butyl-4-hydroxyanisole, 2-t-butyl-4-hydroxyanisole, octyl 3-(4-hydroxy-3,5-di-t-butylphenyl)propionate, stearyl 3-(4-hydroxy-3,5-di-t-butylphenyl)propionate, oleyl 3-(4-hydroxy-3,5-di-t-butylphenyl)propionate, dodecyl 3-(4-hydroxy-3,5-di-t-butylphenyl)propionate, decyl 3-(4-hydroxy-3,5-di-t-butylphenyl)propionate, octyl 3-(4-hydroxy-3,5-di-t-butylphenyl)propionate, tetrakis{3-(4-hydroxy-3,5-di-t-butylphenyl)propionyl oxymethyl}methane, 3-(4-hydroxy-3,5-di-t-butylphenyl)propionic acid glycerin monoester, an ester of 3-(4-hydroxy-3,5-di-t-butylphenyl)propionic acid and glycerin monooleyl ether, 3-(4-hydroxy-3,5-di-t-butylphenyl)propionic acid butylene glycol diester, 3-(4-hydroxy-3,5-di-t-butylphenyl)propionic acid thiodiglycol diester, 4,4'-thiobis(3-methyl-6-t-butylphenol), 4,4'-thiobis(2-methyl-6-t-butylphenol), 2,2'-thiobis(4-methyl-6-t-butylphenol), 2,6-di-t-butyl-α-dimethylamino-p-cresol, 2,6-di-t-butyl-4-(N,N'-dimethylaminomethylphenol), bis(3,5-di-t-butyl-4-hydroxybenzyl)sulfide, tris{(3,5-di-t-butyl-4-hydroxyphenyl)propionyl-oxyethyl}isocyanurate, tris(3,5-di-t-butyl-4-hydroxyphenyl)isocyanurate, 1,3,5-tris(3,5-di-t-butyl-4-hydroxybenzyl)isocyanurate, a bis{2-methyl-4-(3-n-alkylthiopropionyloxy)-5-t-butylphenyl}sulfide, 1,3,5-tris(4-t-butyl-3-hydroxy-2,6-dimethylbenzyl)isocyanurate, tetraphthaloyl-di(2,6-dimethyl-4-t-butyl-3-hydroxybenzyl sulfide), 6-(4-hydroxy-3,5-di-t-butylanilino)-2,4-bis(octylthio)-1,3,5-triazine, 2,2-thio-{diethyl-bis-3-(3,5-di-t-butyl-4-hydroxyphenyl)}propionate, N,N'-hexamethylenebis(3,5-di-t-butyl-4-hydroxy-hydrocinnamide), 3,9-bis[1,1-dimethyl-2-{β-(3-t-butyl-4-hydroxy-5-methylphenyl)propionyloxy}ethyl]-2,4,8,10-tetraoxaspiro[5,5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, and bis{3,3'-bis-(4'-hydroxy-3'-t-butylphenyl)butyric acid}glycol ester. Of these, a compound represented by the following general formula (4) is preferred because of its good anti-oxidation performance.

[Chem. 5]

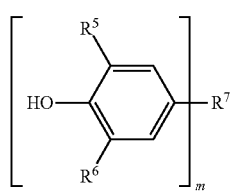

(4)

(wherein $R^5$ and $R^6$ each independently represent a hydrogen atom or an alkyl group having 1 to 4 carbon atoms, $R^7$ represents a hydrocarbon group having 1 to 20 carbon atoms which may contain an ester group, and m represents a number from 1 to 4. However, either $R^5$ or $R^6$ must represent an alkyl group having 1 to 4 carbon atoms.)

In the compound represented by the general formula (4), $R^5$ and $R^6$ each independently represent a hydrogen atom or an alkyl group having 1 to 4 carbon atoms. Examples of the alkyl group having 1 to 4 carbon atoms include a methyl group, an ethyl group, a propyl group, a branched propyl group, a butyl group, a branched butyl group, and a tertiary butyl group. Although $R^5$ and $R^6$ must not simultaneously represent hydrogen atoms, and either one or both of the substituents must be an alkyl group having 1 to 4 carbon atoms, because of the good anti-oxidation properties, it is preferred that both of $R^5$ and $R^6$ be alkyl groups having 1 to 4 carbon atoms, and it is more preferred that both of $R^5$ and $R^6$ be a tertiary butyl group.

$R^7$ represents a hydrocarbon group having 1 to 20 carbon atoms which may contain an ester group, and m represents a number of 1 to 4. When m represents 1, $R^7$ is, for example: an alkyl group such as a methyl group, an ethyl group, a propyl group, a branched propyl group, a butyl group, a branched butyl group, a hexyl group, a branched hexyl group, a pentyl group, a branched pentyl group, a heptyl group, a branched heptyl group, an octyl group, a branched octyl group, a 2-ethylhexyl group, a nonyl group, a branched nonyl group, a decyl group, a branched decyl group, a dodecyl group, a branched dodecyl group, a tridecyl group, a branched tridecyl group, a tetradecyl group, a branched tetradecyl group, a pentadecyl group, a branched pentadecyl group, a hexadecyl group, a branched pentadecenyl group, a heptadecyl group, a branched heptadecyl group, an octadecyl group, a branched octadecyl group, or an eicosyl group; an alkenyl group such as a vinyl group, a propenyl group, a butenyl group, an isobutenyl group, a pentenyl group, a hexenyl group, a heptenyl group, an octenyl group, a decenyl group, a dodecenyl group, a pentadecenyl group, or an octadecenyl group; an aryl group such as a phenyl group, a toluyl group, a xylyl group, a cumenyl group, a mesityl group, a benzyl group, a phenethyl group, a styryl group, a cinnamyl group, a benzhydryl group, a trityl group, an ethylphenyl group, a propylphenyl group, a butylphenyl group, a pentylphenyl group, a hexylphenyl group, a heptylphenyl group, an octylphenyl group, a nonylphenyl group, a decylphenyl group, an undecylphenyl group, or a dodecylphenyl group; or a cycloalkyl group such as a cyclopentyl group, a cyclohexyl group, a cycloheptyl group, a methylcyclopentyl group, a methylcyclohexyl group, a methylcycloheptyl group, a cyclopentenyl group, a cyclohexenyl group, a cycloheptenyl group, a methylcyclopentenyl group, a methylcyclohexenyl group, or a methylcycloheptenyl group. Of these, a linear alkyl group is preferred, and a linear alkyl group having 6 to 20 carbon atoms is more preferred, because of its good anti-oxidation performance.

Further, the group containing an ester group is, for example, represented by the following general formula (5):

(wherein $R^8$ represents an alkylene group having 1 to 6 carbon atoms, and $R^9$ represents a hydrocarbon group having 1 to 20 carbon atoms.)

$R^8$ is, for example, a methylene group, an ethylene group, a propylene group, a butylene group, a pentylene group, or a hexylene group. Of these, an ethylene group is preferred because of the easy availability of the raw material.

Further, $R^9$ is, for example: an alkyl group such as a methyl group, an ethyl group, a propyl group, a branched propyl group, a butyl group, a branched butyl group, a hexyl group, a branched hexyl group, a pentyl group, a branched pentyl group, a heptyl group, a branched heptyl group, an octyl group, a branched octyl group, a 2-ethylhexyl group, a nonyl group, a branched nonyl group, a decyl group, a branched decyl group, a dodecyl group, a branched dodecyl group, a tridecyl group, a branched tridecyl group, a tetradecyl group, a branched tetradecyl group, a pentadecyl group, a branched pentadecyl group, a hexadecyl group, a branched pentadecenyl group, a heptadecyl group, a branched heptadecyl group, an octadecyl group, a branched octadecyl group, or an eicosyl group; an alkenyl group such as a vinyl group, a propenyl group, a butenyl group, an isobutenyl group, a pentenyl group, a hexenyl group, a heptenyl group, an octenyl group, a decenyl group, a dodecenyl group, a pentadecenyl group, or an octadecenyl group; an aryl group such as a phenyl group, a toluyl group, a xylyl group, a cumenyl group, a mesityl group, a benzyl group, a phenethyl group, a styryl group, a cinnamyl group, a benzhydryl group, a trityl group, an ethylphenyl group, a propylphenyl group, a butylphenyl group, a pentylphenyl group, a hexylphenyl group, a heptylphenyl group, an octylphenyl group, a nonylphenyl group, a decylphenyl group, an undecylphenyl group, or a dodecylphenyl group; or a cycloalkyl group such as a cyclopentyl group, a cyclohexyl group, a cycloheptyl group, a methylcyclopentyl group, a methylcyclohexyl group, a methylcycloheptyl group, a cyclopentenyl group, a cyclohexenyl group, a cycloheptenyl group, a methylcyclopentenyl group, a methylcyclohexenyl group, or a methylcycloheptenyl group. Of these, an alkyl group is preferred, a linear alkyl group is more preferred, and a linear alkyl group having 6 to 18 carbon atoms is even more preferred, because of its good anti-oxidation performance.

When m is 2, $R^7$ is, for example, an alkylene group such as a methylene group, an ethylene group, a propylene group, a butylene group, a pentylene group, a hexylene group, a heptylene group, an octylene group, a nonylene group, a decylene group, a dodecylene group, a tetradecylene group, a hexadecylene group, or an octadecylene group. Further, the group containing an ester group is, for example, given by the following general formula (6).

[Chem. 6]

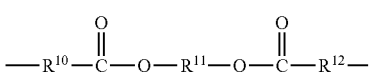

(6)

(wherein $R^{10}$, $R^{11}$ and $R^{12}$ each independently represent an alkylene group having 1 to 16 carbon atoms.)

$R^{10}$, $R^{11}$ and $R^{12}$ may be, for example, a methylene group, an ethylene group, a propylene group, a butylene group, a pentylene group, a hexylene group, a heptylene group, an octylene group, a nonylene group, a decylene group, a docecylene group, a tetradecylene group, or a hexadecylene group.

When m is 3, $R^7$ is, for example, given by the following general formula (7) or general formula (8). When m is 4, $R^7$ is, for example, given by the following general formula (9) or general formula (10).

[Chem. 7]

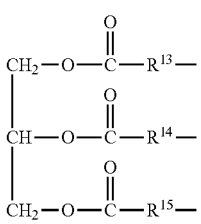

(7)

(wherein $R^{13}$ to $R^{15}$ each independently represent an alkylene group having 1 to 6 carbon atoms.)

[Chem. 8]

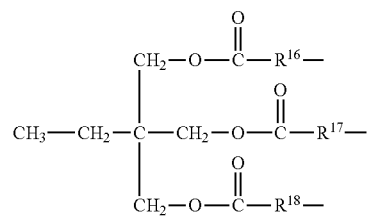

(8)

(wherein $R^{16}$ to $R^{18}$ each independently represent an alkylene group having 1 to 6 carbon atoms.)

[Chem. 9]

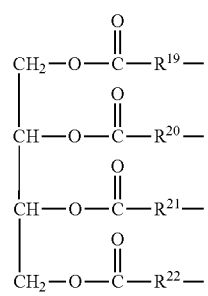

(9)

(wherein $R^{19}$ to $R^{22}$ each independently represent an alkylene group having 1 to 6 carbon atoms.)

[Chem. 10]

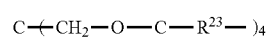

(10)

(wherein $R^{23}$ represents an alkylene group having 1 to 6 carbon atoms.)

$R^{13}$ to $R^{23}$ in the compounds with the general formulae (7) to (10) may be, for example, a methylene group, an ethylene group, a propylene group, a butylene group, a pentylene group, or a hexylene group. Of these, an ethylene group is preferred because of the easy availability of the raw material.

A composition obtained by adding the amine-based antioxidant (B) and/or the phenol-based antioxidant (C) to the compound (A) represented by the general formula (1) has improved anti-oxidation performance due to synergistic effect of the components. Irrespective of the blending ratio of each of the components, these synergistic effects occur at any blending ratio, but the ratio of the compound (A) to the amine-based antioxidant (B) and/or the phenol-based antioxidant (C) is preferably 30/70 to 99/1 (mass ratio), more preferably 50/50 to 97/3, still more preferably 70/30 to 95/5 as higher effects can be expected. When the addition amount of the compound (A) is too large, the synergistic effect of anti-oxidation performance may not be sufficiently demonstrated. When the addition amount of the compound (A) is too small, the dispersion performance of the compound (A) may not be sufficiently demonstrated, or the synergistic effect may not be sufficiently demonstrated.

The lubricating oil composition of the present invention is a composition including a base oil and the antioxidant composition of the present invention as essential components. Any base oil which may be used as a base oil of a lubricating oil may be used as the base oil. Examples of these include: synthetic oils such as poly-α-olefin, an ethylene-α-olefin copolymer, polybutene, an alkylbenzene, an alkylnaphthalene, a polyalkylene glycol, polyphenyl ether, an alkyl-substituted diphenyl ether, a polyol ester, a dibasic acid ester, a carbonic acid ester, or gas to liquids (GTL); and a paraffinic mineral oil, a naphthenic mineral oil, or a refined mineral oil thereof. These base oils may each be used alone or may be used as a mixture. Of these base oils, it is preferable to use a base oil having a viscosity index of 100 or more, and it is more preferable to use poly-α-olefin, GTL, or a refined mineral oil having a viscosity index of 100 or more, because the range of applications as a lubricating oil is wide and the color tone of the base oil is almost colorless and transparent.

In addition, the lubricating oil composition of the present invention includes grease. Examples given for the thickener which is an essential component of grease, a soap-based or complex soap-based thickener, an organic non-soap-based thickener, an inorganic non-soap-based thickener, and a mixture thereof. Examples given for the soap-based thickener include soaps each obtained by allowing a higher fatty acid such as lauric acid, myristic acid, palmitic acid, stearic acid, 12-hydroxystearic acid, arachic acid, behenic acid, zoomaric acid, oleic acid, linoleic acid, linolenic acid, or ricinoleic acid to react with a base of aluminum, barium, calcium, lithium, sodium, potassium, or the like; complex soap thickeners obtained by further allowing acetic acid, benzoic acid, sebacic acid, azelaic acid, phosphoric acid, boric acid, or the like to react with the fatty acid and the base. Examples given for the organic non-soap-based thickener include a terephthalate-based thickener, a urea-based thickener, and a fluorine-based thickener such as polytetrafluoroethylene or a fluorinated ethylene-propylene copolymer. Examples of the urea-based thickener include a monourea-based compound obtained by a reaction of a monoisocyanate and a monoamine, a diurea-based compound obtained by a reaction of a diisocyanate and a monoamine, a ureaurethane-based compound obtained by a reaction of a diisocyanate, a monoamine, and a monool, and a tetraurea-based compound obtained by a reaction of a diisocyanate, a diamine, and a monoisocyanate. Examples given for the inorganic non-soap-based thickener include montmorillonite, bentonite, silica aerogel, and boron nitride. The blending amount of each of these thickeners is not particularly limited. The blending amount has only to be generally 3 to 40 mass %, preferably 5 to 20 mass %, with respect to the total amount of the grease composition.

The blending amount of the antioxidant composition of the present invention to be added to the lubricating oil composition of the present invention is not particularly limited, and is preferably 0.01 to 10 mass %, more preferably 0.05 to 5 mass %, still more preferably 0.1 to 3 mass %, with respect to the total amount of the lubricating oil composition. When the blending amount is less than 0.01 mass %, a sufficient antioxidation effect may not be obtained. When the blending amount is more than 10 mass %, an effect proportionate to the addition amount may not be obtained, or the product stability of the lubricating oil composition may deteriorate.

Further, a known lubricating oil additive may be added to the lubricating oil composition of the present invention depending on the intended purpose. For example, a friction modifier, an anti-wear agent, an extreme-pressure agent, an oiliness agent, a detergent, a dispersant, a viscosity index improver, a pour point depressant, a rust inhibitor, a corrosion inhibitor, or an anti-foaming agent may be added as long as the effect of the present invention is not impaired.

Examples of the friction modifier include organic molybdenum compounds such as a sulfurized oxymolybdenum dithiocarbamate and a sulfurized oxymolybdenum dithiophosphate. The blending amount of each of those friction reducers is 30 to 2,000 mass ppm, more preferably 50 to 1,000 mass ppm in terms of molybdenum content, with respect to the total amount of the lubricating oil composition. In this regard, however, it is preferable to use a sulfurized oxymolybdenum dithiocarbamate rather than a sulfurized oxymolybdenum dithiophosphate containing a phosphorus atom, and it is more preferable to use a sulfurized oxymolybdenum dithiocarbamate having an alkyl group having 8 to 13 carbon atoms.

Examples given for the anti-wear agent include a compound represented by the following general formula (11):

[Chem. 11]

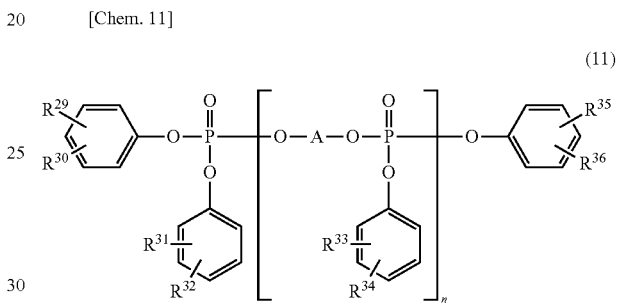

(11)

(wherein A represents one of the following general formulae (12) to (14), $R^{29}$ to $R^{36}$ each independently represent a hydrogen atom or an alkyl group having 1 to 3 carbon atoms, and n represents a number from 1 to 10.)

[Chem. 12]

(12)

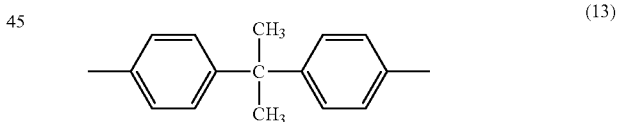

(13)

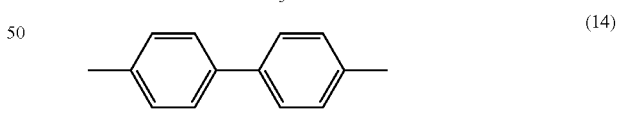

(14)

$R^{29}$ to $R^{36}$ each independently represent a hydrogen atom or an alkyl group having 1 to 3 carbon atoms. Examples of the alkyl group having 1 to 3 carbon atoms include a methyl group, an ethyl group, and a propyl group. Of these, a hydrogen atom and a methyl group are preferred because of good anti-wear performance. The blending amount of each of these anti-wear agents is preferably 0.01 to 5 mass %, more preferably 0.1 to 3 mass %, with respect to the total amount of the lubricating oil composition.

Examples of the extreme-pressure agent include: sulfur-based additives such as a sulfurized oil and fat, olefin polysulfide, and dibenzyl sulfide; phosphorus-based compounds such as monooctyl phosphate, tributyl phosphate, triphenyl phosphite, tributyl phosphite, a thiophosphoric acid ester, and zinc dithiophosphate; and organic metal compounds such as a metal salt of thiophosphoric acid, a metal salt of thiocarbamic acid, and a metal salt of an acidic phosphoric acid ester. The blending amount of each of these extreme-pressure agents is preferably 0.01 to 2 mass %, more preferably 0.05 to 1 mass % with respect to the total amount of the lubricating oil composition.

Examples of the oiliness agent include: higher alcohols such as oleyl alcohol and stearyl alcohol; fatty acids such as oleic acid and stearic acid; esters such as oleyl glycerin ester, stearyl glycerin ester, and lauryl glycerin ester; amides such as lauryl amide, oleyl amide, and stearyl amide; amines such as laurylamine, oleylamine, and stearylamine; and ethers such as lauryl glycerin ether and oleyl glycerin ether. The blending amount of each of these oiliness agents is preferably 0.1 to 5 mass %, more preferably 0.2 to 3 mass % with respect to the total amount of the lubricating oil composition.

Examples of the detergent include sulfonates, phenates, salicylates, and phosphates of calcium, magnesium, and barium, and perbasic salts thereof. Of these, perbasic salts are preferred. Of the perbasic salts, a perbasic salt having a total basic number (TBN) of 30 to 500 mgKOH/g is more preferred. A salicylate-based detergent free of phosphorus and sulfur atoms is even more preferred. The blending amount of each of these detergents is preferably 0.5 to 10 mass %, more preferably 1 to 8 mass % with respect to the total amount of the lubricating oil composition.

Examples of the dispersant include succinimide, a succinic acid ester, and benzylamine to each of which an alkyl group or an alkenyl group has been added and each of which has a weight-average molecular weight of about 500 to 3,000, and boron-denatured products thereof. The blending amount of each of these dispersants is preferably 0.5 to 10 mass %, more preferably 1 to 8 mass % with respect to the total amount of the lubricating oil composition.

Examples of the viscosity index improver include poly (C1 to C18)alkyl methacrylates, (C1 to C18)alkyl acrylate/(C1 to C18)alkyl methacrylate copolymers, diethylaminoethyl methacrylate/(C1 to C18)alkyl methacrylate copolymers, ethylene/(C1 to C18)alkyl methacrylate copolymers, polyisobutylenes, polyalkylstyrenes, ethylene/propylene copolymers, styrene/maleic acid ester copolymers, and styrene/isoprene hydrogenated copolymers. Alternatively, a dispersion-type or multi-functional viscosity index improver to which dispersing performance has been imparted may be used. Its weight-average molecular weight may be about 10,000 to 1,500,000, preferably about 30,000 to 1,000,000. The blending amount of each of these viscosity index improvers is preferably 0.1 to 20 mass %, more preferably 0.3 to 15 mass % with respect to the total amount of the lubricating oil composition.

Examples of the pour point depressant include polyalkyl methacrylates, polyalkyl acrylates, polyalkylstyrenes, and polyvinyl acetates. Its weight-average molecular weight may be about 1,000 to 100,000, preferably about 3,000 to 80,000. The blending amount of each of these pour point depressants is preferably 0.005 to 3 mass %, more preferably 0.01 to 2 mass %, with respect to the total amount of the lubricating oil composition.

Examples of the rust inhibitor include sodium nitrite, oxidized paraffin wax calcium salts, oxidized paraffin wax magnesium salts, beef tallow fatty acid alkali metal salts, alkaline earth metal salts, or amine salts, alkenyl succinic acids or alkenyl succinic acid half esters (the molecular weight of the alkenyl group is about 100 to 300), sorbitan monoesters, nonylphenol ethoxylates, and calcium salts of lanolin fatty acids. The blending amount of each of these rust inhibitors is blended preferably 0.01 to 3 mass %, more preferably 0.02 to 2 mass % with respect to the total amount of the lubricating oil composition.

Examples of the corrosion inhibitor include benzotriazole, benzimidazole, benzothiazole and tetraalkylthiuram disulfide. The blending amount of each of these corrosion inhibitors is preferably 0.01 to 3 mass %, more preferably 0.02 to 2 mass % with respect to the total amount of the lubricating oil composition.

Examples of the anti-foaming agent include polydimethylsilicones, trifluoropropylmethylsilicone, colloidal silica, polyalkyl acrylates, polyalkyl methacrylates, alcohol ethoxy/propoxylate, fatty acid ethoxy/propoxylate, and sorbitan partial fatty acid esters. The blending amount of each of these anti-foaming agents is preferably 0.001 to 0.1 mass %, more preferably 0.001 to 0.01 mass % with respect to the total amount of the lubricating oil composition.

The lubricating oil composition of the present invention may be used for any of general lubricating oil application, for example, applications such as engine oils, gear oils, turbine oils, hydraulic oils, fire-resistant hydraulic fluids, refrigerating machine oils, compressor oils, vacuum pump oils, bearing oils, insulating oils, slideway oils, rock drill oils, metal working oils, plastic working oils, heat treatment oils and greases, and is preferably used for applications which require high anti-oxidation performance, such as engine oils, turbine oils, metal working oils and greases.

EXAMPLES

Hereinafter, the present invention is specifically described by way of examples.
<Samples>
(A-1): mixture of 90 mass % of 2,4-distyrenated phenol, 5 mass % of 2-monostyrenated phenol, and 5 mass % of 2,4,6-tristyrenated phenol
(A-2): 2-monostyrenated phenol
(A-3): 2,4,6-tristyrenated phenol
(B-1): dioctylamine

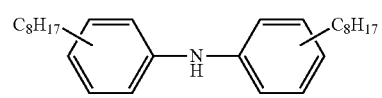

[Chem. 13]

Each $C_8H_{17}$ represents a branched alkyl group
(B-2): N-phenyl-octylnaphthalen-1-amine

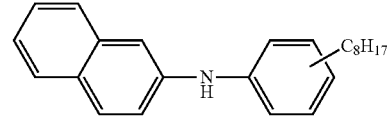

[Chem. 14]

$C_8H_{17}$ represents a branched alkyl group
(C-1): branched octyl 3-(4-hydroxy-3,5-di-t-butylphenyl) propionate
(C-2): linear octadecyl 3-(4-hydroxy-3,5-di-t-butylphenyl) propionate
(D-1): 1,2,4-benzenetricarboxylic acid tris(2-ethylhexyl) ester
(D-2): nonylphenol
<Preparation of Specimens>
The above-mentioned samples were blended in accordance with the formulations in Table 1. The resultant test samples were used for an anti-oxidation property test and a stability test. It should be noted that the samples (D-1) and (D-2) are solvents for comparison with the compound (A). Further, each of test samples 1 to 11 was a transparent liquid at normal temperature.

TABLE 1

Formulation table

| | Test sample | | | | | | | | | | |
|---|---|---|---|---|---|---|---|---|---|---|---|
| | 1 | 2 | 3 | 4 | 5 | 6 | 7 | 8 | 9 | 10 | 11 |
| A-1 | 80 | 80 | 80 | 80 | 90 | | | | | | |
| A-2 | | | | | | 80 | | | | | |
| A-3 | | | | | | | 80 | | | | |
| B-1 | 20 | | | | | | | | | | |
| B-2 | | 20 | | | | 20 | 20 | 20 | 20 | | |
| C-1 | | | 20 | | | | | | | | |
| C-2 | | | | 20 | 10 | | | | | 20 | 20 |

TABLE 2

Anti-oxidation property test results of blend products

| | | Test sample | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Anti-oxidation property test results (min) | Base oil 1 | 78 | 82 | 68 | 70 | 69 | 78 | 79 | 34 | 38 | 30 | 32 |
| | Base oil 2 | 80 | 86 | 71 | 72 | 72 | 81 | 80 | 36 | 40 | 33 | 35 |

TABLE 3

Anti-oxidation property test results of used samples

| | | Sample | | | | | | | | |
|---|---|---|---|---|---|---|---|---|---|---|
| | | A-1 | A-2 | A-3 | B-1 | B-2 | C-1 | C-2 | D-1 | D-2 |
| Anti-oxidation property test results (min) | Base oil 1 | 63 | 36 | 40 | 72 | 76 | 63 | 66 | 0 | 12 |
| | Base oil 2 | 65 | 37 | 42 | 75 | 78 | 66 | 68 | 0 | 15 |

TABLE 1-continued

Formulation table

| | Test sample | | | | | | | | | | |
|---|---|---|---|---|---|---|---|---|---|---|---|
| | 1 | 2 | 3 | 4 | 5 | 6 | 7 | 8 | 9 | 10 | 11 |
| D-1 | | | | | | | | 80 | | 80 | |
| D-2 | | | | | | | | | 80 | | 80 |

*The blending amounts in the table are on a mass basis.

<Anti-Oxidation Test>

The test was carried out in conformity with a method of JIS K-2514. Specifically, 50 g of a specimen, 5 g of water, and 3 m of a copper wire as a catalyst rolled into a compact size and having a diameter of 1.6 mm are loaded into a pressure-resistant cylinder equipped with a pressure meter and having a volume of 100 ml. After sealing, oxygen is injected into the cylinder until the internal pressure of the cylinder reaches 620 kPa. The cylinder is rotated at 100 rpm in a thermostat bath at 150° C. while being kept at an angle of 30° C. The internal pressure of the cylinder initially increases with an increase in temperature. However, the internal pressure of the cylinder decreases owing to the absorption of oxygen when oxidative degradation starts. The pressure was measured over time, and the time period required for a decrease from the highest pressure to 175 kPa was determined. The time period was defined as an induction period for oxidative degradation. A specimen showing a longer induction period has more satisfactory anti-oxidation performance. It should be noted that specimens obtained by adding the test samples prepared in accordance with the formulation table at 0.5 mass % to the following base oils were used. Further, the samples themselves used for comparison were also subjected to the test. Also in the test of the samples themselves, specimens obtained by adding the samples at 0.5 mass % to the following base oil 1 or 2 were used.

Base oil 1: mineral oil-based base oil having dynamic viscosities of 4.24 mm$^2$/sec (100° C.) and 19.65 mm$^2$/sec (40° C.), and a viscosity index of 126

Base oil 2: poly-α-olefin having dynamic viscosities of 4.0 mm$^2$/sec (100° C.) and 18.4 mm$^2$/sec (40° C.), and a viscosity index of 119

The results of Table 2 and Table 3 revealed that each of the amine-based antioxidant (B) and the phenol-based antioxidant (C) mixed with the component (A) of the present invention showed increased anti-oxidation performance. Thus, a synergistic effect by blending the components was found. On the other hand, other solvents (D-1) and (D-2) did not provide any synergistic effect.

The invention claimed is:

1. An antioxidant composition for a lubricating oil composition, consisting of:
   a compound (A) represented by the following formula (1);
   at least 1 mass % of an amine-based antioxidant (B) selected from the following formulas (2) and (3) based on a total of components (A), (B) and (C); and
   at least 1 mass % of a phenol-based antioxidant (C) represented by the following formula (4) based on a total of components (A), (B) and (C),
   wherein a ratio of the compound (A) to the amine-based antioxidant (B) and the phenol-based antioxidant (C) is 70/30 to 95/5 in terms of weight ratio:

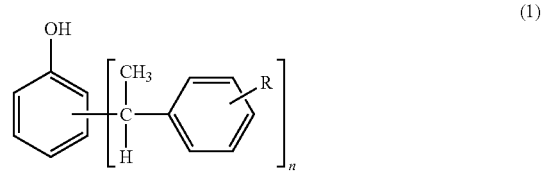

(1)

wherein R represents a hydrogen atom or an alkyl group having 1 to 4 carbon atoms, and n represents a number from 1 to 3;

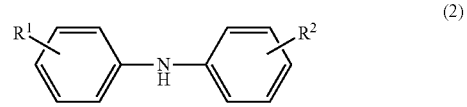

(2)

wherein R¹ and R² each independently represents a hydrogen atom or an aliphatic hydrocarbon group having 1 to 18 carbon atoms;

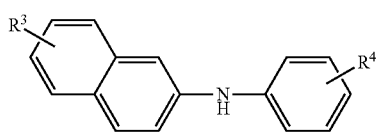
(3)

wherein R³ and R⁴ each independently represents a hydrogen atom or an aliphatic hydrocarbon group having 1 to 18 carbon atoms;

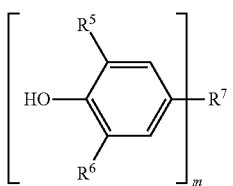
(4)

wherein R⁵ and R⁶ each independently represents any one of a hydrogen atom and an alkyl group having 1 to 4 carbon atoms, R⁷ represents a hydrocarbon group having 1 to 20 carbon atoms which may contain an ester group, and m represents a number of 1 to 4, provided that any one of R⁵ and R⁶ must be an alkyl group having 1 to 4 carbon atoms.

2. A lubricating oil composition, comprising:

the antioxidant composition according to claim 1; and a base oil, wherein a blending amount of the antioxidant composition is 0.01 to 10 mass % with respect to a total amount of the lubricating oil composition.

* * * * *